United States Patent
Mard

[15] 3,690,607
[45] Sept. 12, 1972

[54] VIBRATION ISOLATION SYSTEM

[72] Inventor: Kenneth C. Mard, 160 Wilbrook Road, Stratford, Conn. 06075

[22] Filed: Feb. 16, 1970

[21] Appl. No.: 14,842

Related U.S. Application Data

[62] Division of Ser. No. 643,518, June 5, 1967, Pat. No. 3,514,054.

[52] U.S. Cl. ............... 248/20, 188/1 B, 244/17.25, 248/358 R
[51] Int. Cl. ................ B64c 27/04, F16f 15/10
[58] Field of Search ....... 248/15, 20, 358 R; 267/113, 267/136; 244/17.25, 17.27; 188/88.51, 97, 1 B

[56]         References Cited

UNITED STATES PATENTS

| | | | |
|---|---|---|---|
| 1,522,243 | 1/1925 | Hughes | 188/88.51 |
| 2,569,882 | 10/1951 | De Bathezat | 244/17.25 |
| 2,756,989 | 7/1956 | Peras | 188/97 X |
| 2,965,372 | 12/1960 | Cavanaugh | 267/1 |
| 3,100,610 | 8/1963 | Armstrong | 244/17.25 |
| 3,118,504 | 1/1964 | Cresap | 244/17.25 X |
| 3,176,940 | 4/1965 | Echeverria | 244/118 |
| 3,236,512 | 2/1966 | Kirsch et al. | 267/1 |
| 3,367,454 | 2/1968 | Schenk et al. | 188/97 X |
| 3,477,665 | 11/1969 | Legrand | 244/17.25 |
| 3,502,290 | 3/1970 | Legrand et al. | 248/15 |

Primary Examiner—J. Franklin Foss
Attorney—Vernon F. Hauschild

[57]         ABSTRACT

This invention relates to a mounting system for a body, such as a wind tunnel model or a helicopter transmission, by which the vibrational loads in one plane or about axes in a common plane can be isolated from the mount while loads in other directions or about other axes can be transferred directly to the mount.

4 Claims, 14 Drawing Figures

AERODYNAMIC TORQUE

FIG.13

VIBRATION ISOLATION SYSTEM

This application is a division of application Ser. No. 643,518 filed June 5, 1967 and now U.S. Pat. No. 3,514,054.

BACKGROUND OF THE INVENTION

This invention relates to a mounting system in which vibrations in one principal direction are transmitted between the body and the support while other vibrations are isolated within the body and the support. In conventional mounting systems, there are generally two approaches which have been taken. The first of these is to rigidly connect one body to the support such that the body and the support take on the appearance of a unified structure. The second is to mount the body on resilient elements between the body and the support so that all vibrations between the two are attenuated.

It is sometimes desirable to have a direct transmission of all loads in one principal direction and a resilient transmission of loads in the other principal directions. Such a scheme is not so easily acquired since there is generally a cross coupling of loads due to the mounting apparatus itself. This is not desirable in certain instances where the vibrations in one direction only are not desired. For instance, in mounting a dynamic aircraft model in a wind tunnel, the model itself may generate vibrations in the horizontal plane which are transmitted through its mount to load-measuring devices employed during the testing sequence. It has been found by experience that the normally slim supporting arrangements in the wind tunnel can establish a resonance with the dynamic model which will severely interfere with the measurements desired. A mount which is resilient in all three principal directions might alleviate this undesirable vibration, but at the same time it would change the impedance characteristics in all three principal directions which may not be desirable. It would, therefore, be desirable to be able to isolate vibrations, for instance, in the horizontal plane of the model while retaining a high degree of stiffness in the vertical plane.

A similar feature is also advantageous in systems where it is desirable to react torque about one principal axis between two bodies while isolating in each body the vibratory forces or vibratory torques about other principal axes. For example, in a helicopter rotor system it may be desirable to react aerodynamic torque generated by the rotor system directly against the fuselage and at the same time isolate from the fuselage vibrations about axes normal to the rotor axis or vibrational loads in the direction of the rotor axis.

It is therefore desirable to react all loads or torques associated with one principal axis and to attenuate the transmission of vibratory loads or torques associated with other axes.

As might be expected, practical problems arise in the construction of a tuned vibration isolation system. It is important that the resilient system which is employed to isolate vibrations also be capable of carrying a broad band of steady state loads without an excessive amount of static deflection of the resilient elements. In situations where a very low spring rate is desired to tune out a predominant vibration, it may be desirable to have a secondary system to maintain the relative displacement between the body and the support which would otherwise vary greatly under the broad band of resiliently-supported, steady loads.

SUMMARY OF THE INVENTION

In accordance with the problems mentioned in the above discussion, it is a principal object of the mounting system disclosed by this invention to directly transmit all loads or torques associated with one principal axis of a mounted body to its support without attenuation while loads or torques associated with other principal axes are isolated from the support. The mounting arrangement employs an active rather than passive isolator to stabilize the body on the support while an essentially direct connection is used to transmit the desired vibrations directly between the body and the support. It is a feature of these direct connections that they transmit vibrations associated with one axis while motions about another axis are not inhibited. Through the cooperation of the isolators and the direct connections, the body is stabilized and the desired vibration isolation is acquired.

Another feature of the invention also utilizes the cooperative action of the isolators and the direct connections to reduce the spring rate of the mounting system. In one aspect of the invention, this is accomplished by supporting the body in an inherently unstable condition on rigid links aligned with the direction in which maximum stiffness is desired. The active isolators are then used to make the system stable. This causes the spring rate of the isolators to be reduced by a negative spring rate of the body in the unstable condition, and consequently the overall spring rate of the system is reduced.

DESCRIPTION OF PREFERRED EMBODIMENTS

Figure 1:
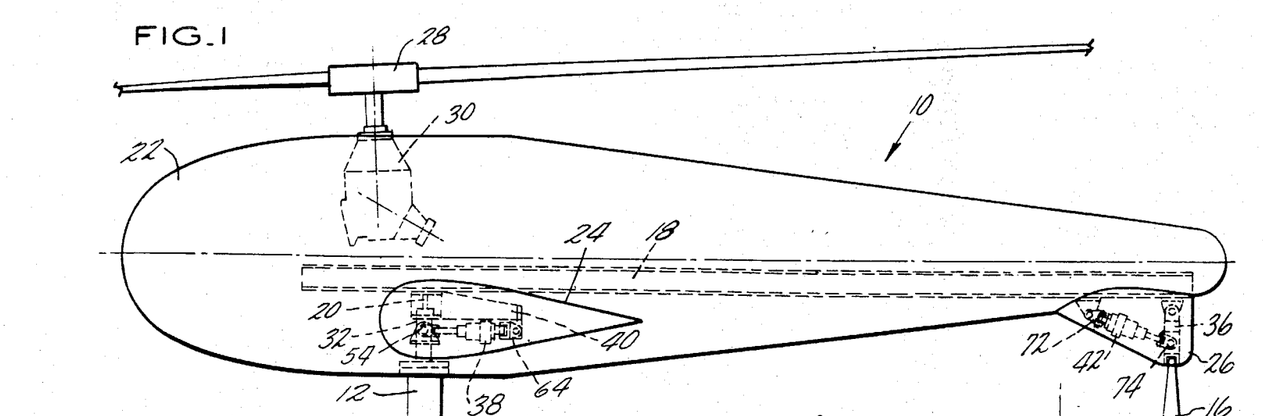
FIG. 1 is a view of a dynamic model mounted on supports by means of an active vibration isolation system.
Figures 2, 3:
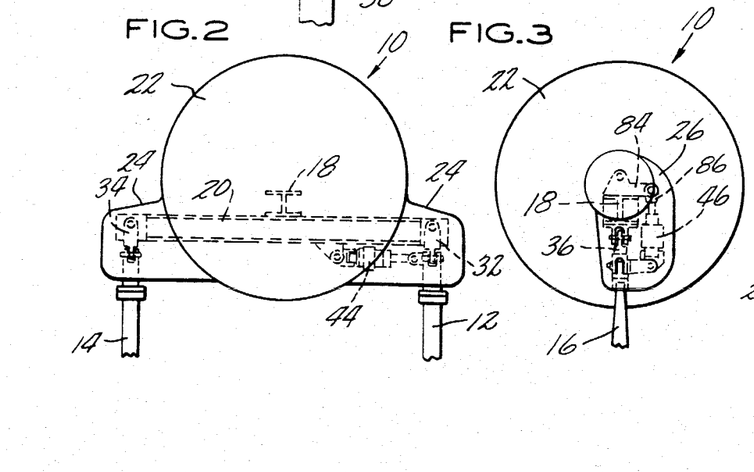
FIG. 2 is a front view of the model on the forward supports.
FIG. 3 is a rear view of the model on the rear support.

With reference to FIGS. 1, 2 and 3, an aircraft model generally designated 10 is shown mounted on top of forward supports 12 and 14 and a rear support 16. The supports 12, 14 and 16 position the model 10 in a wind tunnel and may be connected at their lower ends (not shown) to balancing scales in order to measure the vertical and horizontal loads generated by the model when the wind tunnel is in operation. Since the forces of primary interest are those generated by the model 10 and since the drag produced by the supports introduces a direct error into the force measuring system, the supports are made very slender to minimize their drag. Due to the fact that slender supports are flexible, a resonant condition in the horizontal plane may exist between the model and the supports. For this reason, it is desirable to isolate from the supports the vibrations generated by the model in the horizontal plane while transmitting the steady loads in the horizontal plane and all loads in the vertical direction.

The model is constructed with a longitudinal beam 18 and a lateral beam 20 which form the primary structural frame of the model 10. The skin 22 of the model 10 covers the frame and includes fairings 24 and 26 which cover the beams and vibration isolating attachments to the supports 12, 14 and 16.

This particular model represents an airframe for a helicopter and includes a dynamic rotor system 28 and transmission 30 which can be driven by a motor mounted within the model and powered by batteries or an external power supply.

The model is connected to the supports 12, 14 and 16 by upwardly projecting links 32, 34 and 36 which have spherical end bearings at each connection to the model and the support. Since the links will be placed in compression due to the weight of the model, the model is inherently unstable on the links alone. Vibration isolators are employed to stabilize the model on the supports.

As shown in FIG. 1, a longitudinal isolator 38 is connected between the support 12 and a frame 40 which extends rearwardly from the lateral beam 20 of the model 10. Another isolator (not shown) is similarly placed between the support 14 and another rearwardly extending frame on the opposite side of the model. Another longitudinal isolator 42 is connected between the longitudinal beam 18 and the rear support 16. These three isolators serve to limit the translation of the model 10 in the fore and aft directions. In addition, the isolator 38 and its counterpart (not shown) on the opposite side operate differentially to prevent the rear of the model 10 from moving laterally on the rear link 36.

To position the model laterally and isolate lateral vibrations from the mounts, an isolator 44, shown in FIG. 2, is connected between the lateral beam 20 and the support 12. This lateral isolator 44 and the other three longitudinal isolators would substantially control the vibrations of the model in the horizontal plane; however, due to the flexibility of the model, another isolator 46 (FIG. 3) is connected between the rear support 16 and the longitudinal beam 18 to reduce lateral isolations at the rear of the model which may not otherwise be attenuated through the differential operation of the isolators connected to the forward supports 12 and 14.

Figures 4, 5, 6:
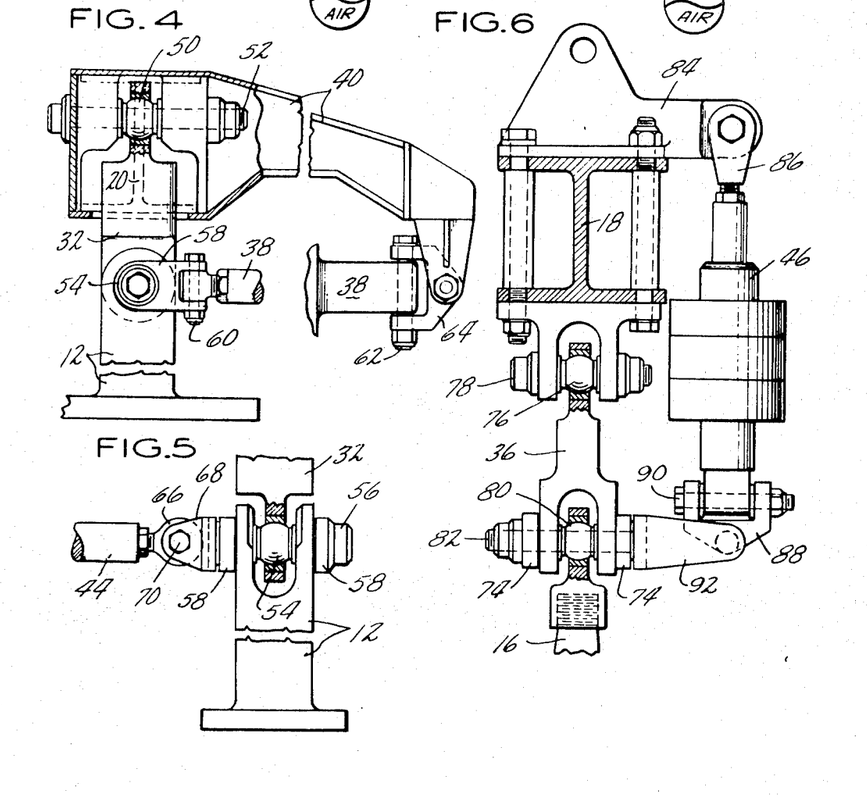
FIG. 4 is a detail showing the mounting arrangement for the longitudinal isolator shown connected to the forward support in FIG. 1.
FIG. 5 is a detail showing the mounting arrangement of the lateral isolator shown in FIG. 2.
FIG. 6 is a detail showing the mounting arrangement at the rear support in FIG. 3.

A more detailed view of the connection of the model 10 with the frame 40 and the forward support 12 can be seen with reference to FIG. 4. As noted above, the lateral beam 20 is connected to the forward support 12 through the link 32. The upper end of the link 32 contains a spherical rod end bearing 50 which is connected by means of bolt 52 to the frame 40 and lateral beam 20. The link 32 is therefore permitted to pivot universally with the model 10. As shown in FIG. 5, the lower end of the link 32 also contains a spherical rod end bearing 54 which is connected by means of bolt 56 to the forward support 12. The bearing 54, therefore, also permits the link 32 to pivot universally with respect to the support 12. Because of the spherical bearings 50 and 54, the link 32 in the vertical position will only transmit vertical loads including vibratory components directly between the model and the support without attenuation.

Bolt 56 pivotally connects clevis 58 to the support 12 and the forward end of the isolator 38 is in turn connected by means of a vertical hinge pin 60 to the clevis 58. The rear end of the isolator 38 is connected by a vertical hinge pin 62 and clevis 64 to the rearwardly extending frame 40. The isolator 38 is therefore connected for universal motion at both its forward and rear end and consequently the longitudinal isolator 38 will not restrict movements of the model other than in the longitudinal direction.

The isolator, not shown, connected between the forward support 14 and the lateral beam 20 is connected in the same manner as isolator 38. Although both isolators restrict motions in the longitudinal direction, it will be readily understood that these isolators operate differentially to prevent lateral movement of the tail of the model on the rear link 36.

In addition to connecting the lower end of link 32 and the clevis 58 to the forward support 12, bolt 56 also serves as the attaching point for the outer end of lateral isolator 44 as shown in FIG. 5. A spherical rod end bearing 66 on the isolator 44 is connected to clevis 68 on the end of bolt 56 by means of bolt 70. The opposite end of isolator 44 is also connected by means of a spherical rod end bearing directly to the lateral beam 20 as shown in FIG. 2, and consequently isolator 44 will only restrict motions of the model in the lateral direction.

The net effect of these attachments to the forward supports 12 and 14 is that each isolator or link restrains only those motions and forces which are respectively aligned with each element. The longitudinal isolator 38 and its counterpart restrict motions in the direction of the longitudinal axis. The lateral isolator 44 restricts motions in the direction of the lateral axis. The links 32 and 34 transmit forces in the direction of the vertical axis. Each element is therefore associated with a motion and force along one of the principal axes.

As seen in FIG. 1, at the tail of the model, a third longitudinal isolator 42 is connected between the longitudinal beam 18 and the rear support 16. The isolator 42 is connected between the model and rear support 16 by means of clevises 72 and 74 which are identical to clevises 64 and 58, respectively. The isolator 42, therefore, will restrain only longitudinal motions. This isolator 42 appears to be redundant with the longitudinal isolators at the forward supports 12 and 14; however, it serves as an independent isolator for the rear support 16 in the event that the compressive load in link 36 initiates longitudinal vibrations due to resonance of the tail section and support 16.

A more detailed view of the connection to the rear support 16 is seen in FIG. 6. Link 36 is connected at its upper end through a spherical rod end bearing 76 and bolt 78 to the rear of the longitudinal beam 18. At the lower end, link 36 is connected to the rear support 16 by means of a spherical rod end bearing 80 and bolt 82. The rear link 36, therefore, is pivoted universally to both the model and the support 16 and will transmit only vertical forces of the model 10 to the support 16.

A laterally projecting bracket 84 connected to the beam 18 serves as a mounting point for a spherical rod end bearing 86 of the isolator 46. The lower end of this isolator 46 is connected by means of a clevis 88 and bolt 90 to a set of lugs 92 which form a part of the bolt 82. Due to the geometry of this connection, the isolator 46 will be extended or contracted whenever the tail of the model moves laterally on the rear support 16. The isolator 46 therefore appears to be redundant with the differential operation of the longitudinal isolator 38 and its counterpart connected to the forward supports 12 and 14; however, isolator 46 serves as an independent damper to attenuate resonant vibrations of the rear support 16 which may be established due to the lateral flexibility of the tail section of the model.

Figure 7:
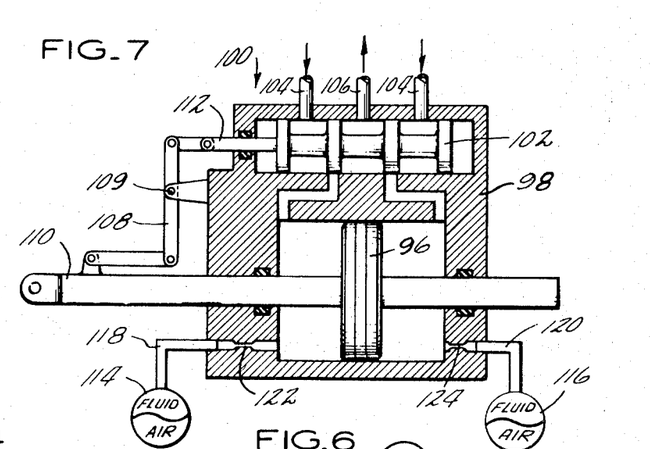
FIG. 7 is a schematic view of the isolator.

From an overall standpoint, it will be clear that the model will transmit vertical loads directly through the links 32, 34 and 36 to the supports 12, 14 and 16, respectively, and these links will permit limited displacement of the model in the horizontal plane. Since the model is inherently unstable when supported on top of the links, the isolators must furnish the necessary stability to hold the model vertically on these links. The isolator, therefore, must not only attenuate vibrations in the horizontal plane, but must position the model with the links vertically thereunder. An isolator of this type is shown in FIG. 7, and is similar to that isolator disclosed in U.S. Pat. No. 3,176,939.

In FIG. 7, the isolator is composed basically from a piston 96 and cylinder 98. A control valve 100 forms a part of the cylinder housing and includes a spool 102 which controls the flow of hydraulic fluid to and from the chambers formed within the cylinder 98 on each side of the piston 96. The hydraulic fluid is admitted to the isolator through the pressure supply lines 104 and discharged from the isolator through return line 106. The isolator includes a feedback linkage 108 pivotally mounted on the isolator at 109 and connected between the piston rod 110 and an operating rod 112 on the spool 102. The linkage 108 supplies the control valve 100 with a position feedback signal such that when the piston rod 110 deviates from a selected position within the isolator, hydraulic fluid is introduced into the cylinder chambers to force the piston back to its selected position. Connected with each cylinder chamber is an accumulator 114 or 116 which may be of the type having an air charge operating against a bladder to compress the hydraulic fluid within each cylinder chamber. The pressure generated by each accumulator when the piston 96 moves rapidly under vibrational loads will cause the isolator piston 96 to apply a resilient force between the model and the support. Included within the conduits 118 and 120 connecting the cylinder and the accumulators are orifices 122 and 124. The accumulators 114 and 116, together with the orifices 122 and 124 will generate loads to attenuate the vibrations sensed by the isolator. The orifices 122 and 124 may be eliminated if sufficient attenuation is provided by the restrictions of the conduits 118 and 120. Spool 102 and the feedback linkage 108, which permit fluid to flow into the cylinder chambers, appear to oppose all oscillations of the piston 96, but the flow of fluid through the valve 100 is much less than the flow between the cylinder chambers and the accumulators and, therefore, the resiliency of the system is not greatly affected by the valve. The valve 100, therefore, will prevent steady state forces from displacing the piston 96 from its selected position and the accumulators and orifices will operate in series with the piston and cylinder to provide the necessary resiliency and damping to attenuate the vibratory motions of the model sensed by the isolator.

Figure 8:
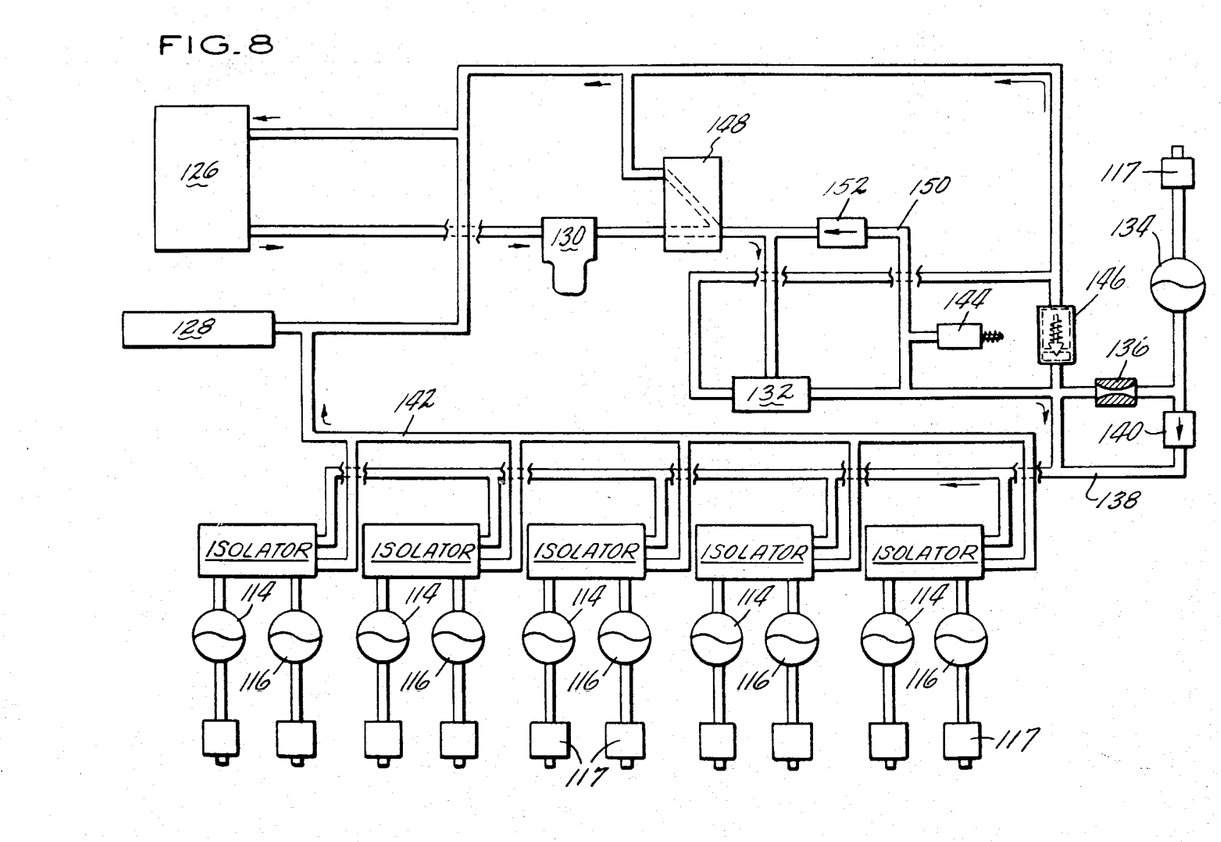
FIG. 8 is a schematic showing the hydraulic system which drives the isolators shown in the mounting system of FIGS. 1, 2 and 3.

A hydraulic system which may be employed to actuate the five isolators is shown in FIG. 8. The primary hydraulic power source is a pump 126. Pump 126 draws fluid from a reservoir 128 and supplies it through a filter 130 to a pressure regulator 132. The fluid pressure is regulated to a pressure sufficient to operate the isolator piston 96 against the largest loads expected to be generated by the model. In order to maintain a fairly constant pressure for the isolators, an accumulator 134 pressurized with air through valve 117 and similar to the accumulators 114 or 116 is charged with hydraulic fluid to the regulated pressure through an orifice 136. If the pressure should drop in the high pressure line 138 due to a sudden demand by the isolators, the accumulator 134 will discharge through the check valve 140 to maintain system pressure for a short period of time. The orifice 136 will prevent the pump 126 from being overloaded while the accumulator is being recharged and therefore system pressure will return more rapidly to the regulated pressures after the sudden demand has emptied the accumulator 134. The five isolators and the accumulators are supplied from the common pressure line 138 and a discharge manifold 142 connects the isolators to the return side of the pump 126 or reservoir 128. The system pressure can be measured by means of a pressure transducer 144. A pressure relief valve 146 is connected between the high pressure and low pressure side of the system in the event that the regulator 132 fails to operate. A shutoff valve 148 connects the high pressure line 138 to the reservoir 128 when the system is shut off in order to drain the hydraulic fluid from all the accumulators 114, 116 and 134. Since the pressure regulator 132 only permits flow in one direction, a drain line 150 including a check valve 152 is included to bypass the regulator 132 between the high pressure line 138 and the shutoff valve 148.

It will be recognized that the model, instead of being supported on top of the links 32, 34 and 36, could just as well have been suspended by links. Such suspension would still permit the utilization of the isolators but would not be inherently unstable as is the system with the upward projecting links. A particular advantage, however, is gained by supporting the model on upward projecting links. As the model moves in the horizontal plane and causes the links to move away from its vertical position, the isolator experiences an additional component of force generated by the weight of the model which component increases in proportion to the displacement of the model for limited deviations of the links from the vertical position. The additional component of force is similar to a spring which operates in opposition to the resilient force created by the accumulators. The resilient force applied by the accumulator must, of course, be greater than the force due to the weight and displacement of the model. Since the force applied by the accumulator approximates the function of a spring for limited displacements of the link, the force applied by the accumulator will be larger than this additional component as long as the effective spring rate of the accumulator is larger than the effective spring rate of the body on the upwardly projecting links. This suspension therefore causes the effective spring rate of the accumulators to be reduced. This is a desirable feature in such suspension systems as disclosed where a low spring rate is necessary to tune out a predominant vibration from a large model. A general characteristic of accumulators which must maintain a constant spring rate under a broad spectrum of loads is the lower the spring rate, the larger the accumulator. It is difficult in the suspension system to develop a very low spring rate from an accumulator having a practical size and a high steady state pressure. By supporting the model on top of the upwardly projecting links, a small accumulator can be employed and yet the effective spring rate of the isolation system will be lower than that of the small accumulator. The suspension system disclosed is made more practical by the upward projecting links.

Figure 9:
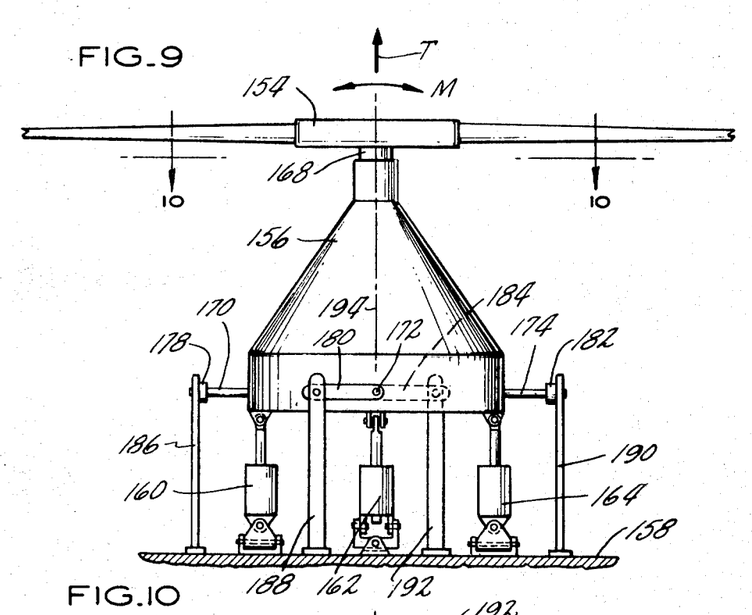
FIG. 9 shows an isolation system adapted to transmit torque directly from a helicopter transmission and rotor system to the fuselage.

The mounting system described above isolates vibrations in the horizontal plane from the supports and transmits steady loads in the horizontal plane and all loads normal so that plane directly into the supports. The isolators and links are not restricted to that particular configuration, but may also be used in other embodiments. For example, the system shown in FIGS. 9 and 10 includes a helicopter rotor 154 and transmission 156 which are mounted to transmit aerodynamically generated rotor torque directly through the rotor shaft 168 and the transmission 156 to the fuselage 158 while the isolators 160, 162, 164 and 166 which are connected for universal pivoting motion carry the rotor thrust T and the steady hub moments M from the transmission 156 to the fuselage and isolate vibratory hub moments in the rotor 154 and transmission 156. The rotor torque is reacted against the fuselage through projections 170, 172, 174 and 176 rigidly fixed to the transmission 156, horizontal links 178, 180, 182 and 184, and transmission mounts 186, 188, 190 and 192. The horizontal links are connected tangentially to the transmission 156 by means of spherical rod end bearings and to the fuselage 158 by means of spherical rod end bearings so that the links will permit a limited displacement of the transmission 156 in the direction of the rotor axis 194. The isolators 160, 162, 164 and 166, will restrain the rotor thrust T and hub moments M, about axes in the base plane of the transmission such as mounting axes 196 and 198, to prevent a significant deviation of the links from the horizontal position. The links, therefore, remain substantially parallel to a plane normal to the rotor axis 194. In addition, the isolators will attenuate the vibratory components of the thrust and the moments which are generated by the rotating blades.

Figure 10:
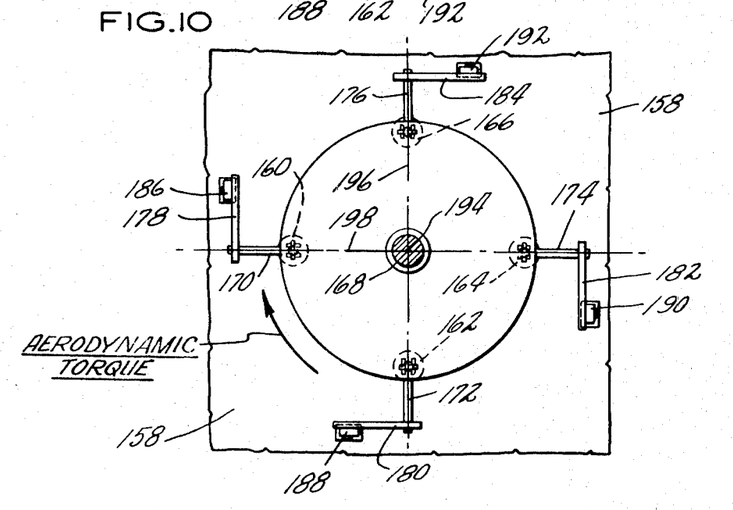
FIG. 10 is a plan view of the isolation system viewed from the line 10—10 of FIG. 9.

The negative spring rate which was obtained by the use of the upwardly projecting links supporting the model can also be acquired in the transmission mounting system by positioning the horizontal links 178, 180, 182 and 184 so that they will be in compression due to the predominant aerodynamic torque reacted against the fuselage 158. Such a torque is indicated in FIG. 10 by the arrow. Since the links are placed in compression, a slight displacement of the links from the horizontal position will generate a force proportional to the displacement of the link and this must be opposed by the spring force of the accumulators in the isolators. Again, this permits the accumulators to be reduced in size without increasing the spring rate of the system.

It will be noted that the links supporting the model 10 carry a generally linear force while the links connected tangentially with the transmission 156 support a torque. In each case, the isolators are mounted to stabilize the supported bodies in each of the other directions which the bodies are free to move. The net result is that in the one principal direction the body is rigidly connected to its support and that all vibrations along axes or about axes other than that controlled by the links are attenuated. Therefore, there are essentially different stiffness characteristics along different principal axes of the supported bodies.

Figure 11:
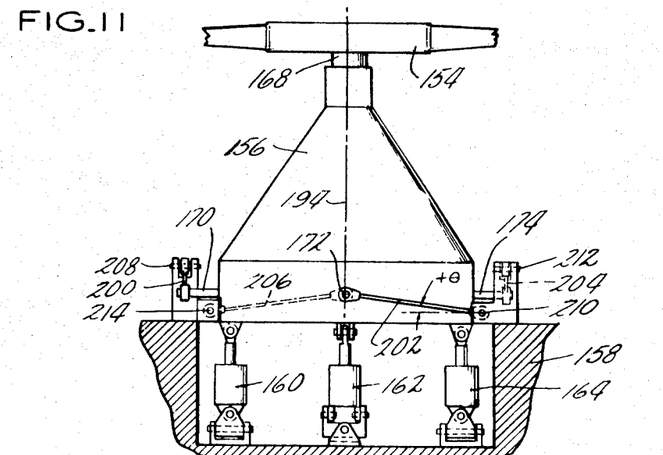
FIG. 11 shows an alternate mounting arrangement employing straps for the transmission and rotor system of FIG. 9.
Figures 12, 13:
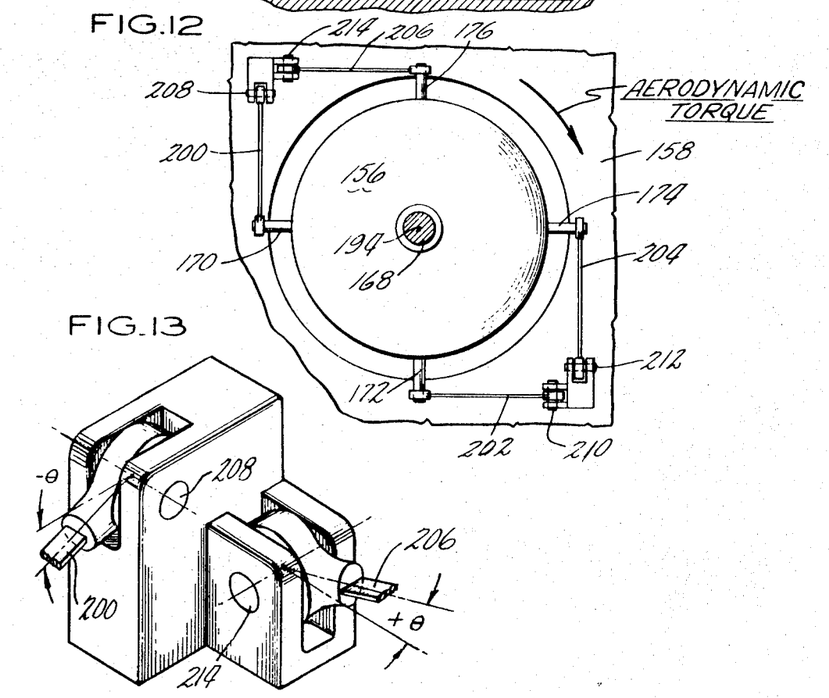
FIG. 12 is a view taken along the lines 12—12 of FIG. 11.
FIG. 13 is a detail showing the connections of the straps shown in FIG. 11.

An alternate mounting arrangement for the transmission 156 is shown in FIGS. 11, 12 and 13. The transmission 156 and the isolators 160, 162, 164 and 166 are the same as previously described. The horizontal links, however, have been eliminated and flexible straps 200, 202 204 and 206 are connected between the projections 170, 172, 174 and 176 on the transmission 156 and anchor points 208, 210, 212 and 214, respectively, on the fuselage 158. It will be noted in FIG. 12 that the flexible straps connected to anchor points on opposite sides of the transmission will restrain horizontal forces and aerodynamic torque in either the clockwise or counterclockwise direction in spite of the fact that the straps cannot carry compressive loads. Straps 202 and 206 will react a clockwise torque as represented by the arrow in FIG. 12. A torque in the opposite direction would be reacted by straps 200 and 204. This configuration is desirable in a transmission for driving a rotor system having counterrotating rotors where the resultant aerodynamic torque may change from one direction to the other due to load changes on the rotors. As in the previous embodiment described above, the isolators 160, 162, 164 and 166 will maintain the vertical positioning of transmission 156 in the fuselage 158 and isolate hub moments generated by the rotor 154 within the transmission while the straps react the aerodynamic torque and horizontal loads against the fuselage.

The flexible straps 200, 202, 204 and 206 may be preferred to the links described above because the spherical rod end bearings are not needed. The small movements of the transmission permitted by the isolators will cause slight twisting and elongation of the straps, but flexible straps taking the form of thin rods or cables can accommodate these distortions. For example in a helicopter transmission which handles 2500 horsepower, the isolators can limit displacements in the vertical direction to ±½ inch. A flexible strap 30 inches long would deviate from the horizontal position approximately 1° and could easily accommodate the small distortions caused by this movement.

Another feature which may be incorporated with the flexible strap embodiment if desired is shown in FIGS. 11 and 13. The straps 202 and 206 are positioned such that they form a small positive angle +θ with a plane which is normal to the rotor axis 194. The alternate straps 200 and 204 are offset from this plane in the opposite direction and form a small negative angle −θ with the plane as shown in FIG. 13. By positioning the adjacent straps with alternately positive and negative angles with respect to this plane, the interaction of the cables does not restrict the limited freedom of displacement of the transmission in the vertical direction. For instance, if the transmission moves upwardly along the rotor axis, the straps 202 and 206 become foreshortened in the horizontal plane and cause the transmission to rotate slightly in the counterclockwise direction. At the same time, straps 200 and 204 become lengthened in the horizontal plane and permit the transmission to rotate as it translates upwardly. It will be understood that a downward displacement of the transmission causes a rotation of the transmission in the opposite direction and a converse operation of the straps. This operation of the straps remains true for small oscillations of the transmission as long as the straps do not pass the horizontal position. If the vertical motions are limited to ±½ inch and the straps are approximately 30 inches long as described above, the maximum value of θ can be limited to 2° and the straps will not oscillate through the horizontal position. The net effect of this arrangement of the straps is the elimination of the mutual operation of the straps which would occur if θ were 0°. In that case, each strap would restrict the vertical motion of the transmission in each direction and the increased elongation of the straps would have to be accommodated by increased flexing of the straps. The straps in the present form, therefore, operate primarily to react the torque loads and the isolators handle the vertical loads of the transmission. The reliance upon the flexibility of the straps is reduced and the stiffnesses of the mounting associated with each of the principal axes remain separated.

It will be evident to those skilled in the art that the FIGS. 11–13 construction will have the advantage of lightness for several reasons. First, the spherical end bearings can be eliminated due to the flexibility of the straps. Second, the straps of FIGS. 11–13 are not only made of a lighter material than the rods of FIGS. 9 and 10, but because the latter carry compression loads and the former carry tension loads, the straps can be made even lighter since mechanisms carrying compression loads need be of greater stiffness, and hence weight, than those carrying tension loads. Third, because each torque moment in the FIGS. 11—13 construction is carried by two straps, whereas each torque moment in the FIGS. 9—10 construction is carried by four links, this lessening of the number of parts reduces total weight further.

Figure 14:
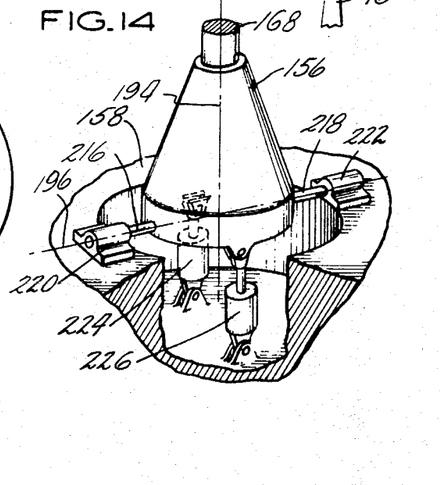
FIG. 14 shows a simplified embodiment of the mounting system in which the vibratory hub moments about a single axis of the transmission are attenuated.

Those skilled in the art will readily understand that the mounting system can be greatly simplified if rotor hub moments about a single axis are to be attenuated. Such a system is shown in FIG. 14. The transmission 156 is mounted by means of stub shafts 216 and 218 which are rigidly fixed to the opposite sides of the transmission 156 and coaxial with axis 196 in the base of the transmission. Shaft 216 is connected to the fuselage 158 for pivotal motion by means of pillow block 220, and shaft 218 is similarly mounted by means of pillow block 222. The transmission, therefore, is free to pivot within the fuselage on the stub shafts 216 and 218 and the shafts in addition react the aerodynamic rotor torque through the pillow blocks 220 and 222 against the fuselage. The isolators 224 and 226 are identical to those previously described and are pivotally connected between the base of the transmission 156 and the fuselage at a position remote from the pivot axis 196. These isolators will attenuate the vibratory hub moments about the pivot axis 196 and at the same time fix the steady state position of the transmission within the fuselage. Although two isolators are shown, it is apparent that a single isolator alone could stabilize the transmission about the axis 196.

It is to be understood that the invention is not limited to the specific embodiments herein illustrated and described but may be used in other ways without departure from its spirit.

We claim:

1. A vibration isolation mounting for transmitting torque about a given axis of a body between the body and a support comprising:
    a. a coupling connecting the body to the support to transmit the torque about the given axis between the body and the support and permitting body movements about axes normal to the given axis and wherein the coupling is formed by a number of flexible straps connected between the body and the support and which lie substantially perpendicular to radials from the given axis.
    b. means restraining movements of the body about the axes normal to the given axis and along the given axis including;
        1. a hydraulic actuator having a piston and cylinder assembly defining chambers at each side of the piston and connected between the body and the support, the actuator being responsive to and restraining displacements of the body and the support in the direction of the given axis, and
        2. a damper operatively connected in series with the piston and cylinder assembly to attenuate vibrations carried by the actuator between the body and the support.

2. Apparatus for mounting a transmission for a thrust producing rotor to the fuselage of an aircraft to reduce the transfer of vibratory rotor hub moments to the fuselage comprising:
    A. a plurality of members connected between the transmission and the fuselage to react the aerodynamic rotor torque against the fuselage,
    B. a plurality of units connected between the transmission and the fuselage for isolating vibratory hub moments within the rotor and transmission, each unit including:

1. a piston and cylinder assembly defining hydraulic chambers on each side of the piston and connected between the transmission and the fuselage to restrain motions in the direction of the rotor thrust,
2. a valve controlling the flow of fluid to the hydraulic chambers of the assembly,
3. a feedback linkage connected between the piston and the valve to position the piston at a selected position of the transmission within the fuselage, and
4. a hydraulic accumulator connected to each of the hydraulic chambers to add resiliency to the restraint provided by the piston and cylinder assembly and to isolate vibratory hub moments from the fuselage, wherein:
   a. the rotor is mounted on a shaft projecting from the transmission; and
   b. the members include four flexible straps which are substantially parallel to a plane normal to the rotor axis, two of the four straps being connected to react aerodynamic torque in one direction against the fuselage and the other two of the four straps being connected to react aerodynamic torque in the opposite direction against the fuselage.

3. Apparatus for mounting a transmission for a thrust producing rotor to the fuselage to an aircraft to reduce the transfer of vibratory rotor hub moments to the fuselage comprising:
   A. a plurality of members connected between the transmission and the fuselage to react the aerodynamic rotor torque against the fuselage,
   B. a plurality of units connected between the transmission and the fuselage for isolating vibratory hub moments within the rotor and transmission, each unit including:
      1. a piston and cylinder assemble defining hydraulic chambers on each side of the piston and connected between the transmission and the fuselage to restrain motions in the direction of the rotor thrust,
      2. a valve controlling the flow of fluid to the hydraulic chambers of the assembly,
      3. a feedback linkage connected between the piston and the valve to position the piston at a selected position of the transmission within the fuselage, and
      4. a hydraulic accumulator connected to each of the hydraulic chambers to add resiliency to the restraint provided by the piston and cylinder assembly and to isolate vibratory hub moments from the fuselage, wherein:
         a. the rotor is mounted on an axis extending from the transmission; and
         b. the members are flexible straps extending tangentially from the transmission to the fuselage, the connections of adjacent straps to the fuselage being alternately offset on opposite sides of a plane normal to the rotor axis to form a small angle between each strap and the normal plane.

4. Apparatus for mounting a transmission for a thrust producing rotor to the fuselage of an aircraft to reduce the transfer of vibratory rotor hub moments to the fuselage comprising:
   A. a plurality of members connected between the transmission and the fuselage to react the aerodynamic rotor torque against the fuselage,
   B. a plurality of units connected between the transmission and the fuselage for isolating vibratory hub moments within the rotor and transmission, each unit including:
      1. a piston and cylinder assembly defining hydraulic chambers on each side of the piston and connected between the transmission and the fuselage to restrain motions in the direction of the rotor thrust,
      2. a valve controlling the flow of fluid to the hydraulic chambers of the assembly,
      3. a feedback linkage connected between the piston and the valve to position the piston at a selected position of the transmission within the fuselage, and
      4. a hydraulic accumulator connected to each of the hydraulic chambers to add resiliency to the restraint provided by the piston and cylinder assembly and to isolate vibratory hub moments from the fuselage, wherein:
         a. the rotor is mounted on a rotor shaft extending vertically from the transmission; and,
         b. the members are flexible straps which are connected to the transmission and extend perpendicular to radials from the rotor axis, the adjacent straps connecting to the fuselage alternately above and below the connecting points to the transmission to form a small angle between the strap and a plane normal to the rotor axis.

* * * * *

UNITED STATES PATENT OFFICE

CERTIFICATE OF CORRECTION

Patent No. 3,690,607       Dated   September 12, 1972

Inventor(s) Kenneth C. Mard

It is certified that error appears in the above-identified patent and that said Letters Patent are hereby corrected as shown below:

In the heading of the Patent add the following after Inventors:

Assignee:  United Aircraft Corporation,
                  East Hartford, Connecticut Signed and sealed this 3rd day of April 1973.

(SEAL)
Attest:

EDWARD M. FLETCHER, JR.          ROBERT GOTTSCHALK
Attesting Officer                Commissioner of Patents